April 7, 1925.  J. P. KUTINA  1,532,416
RIM OPERATING TOOL
Filed April 12, 1923
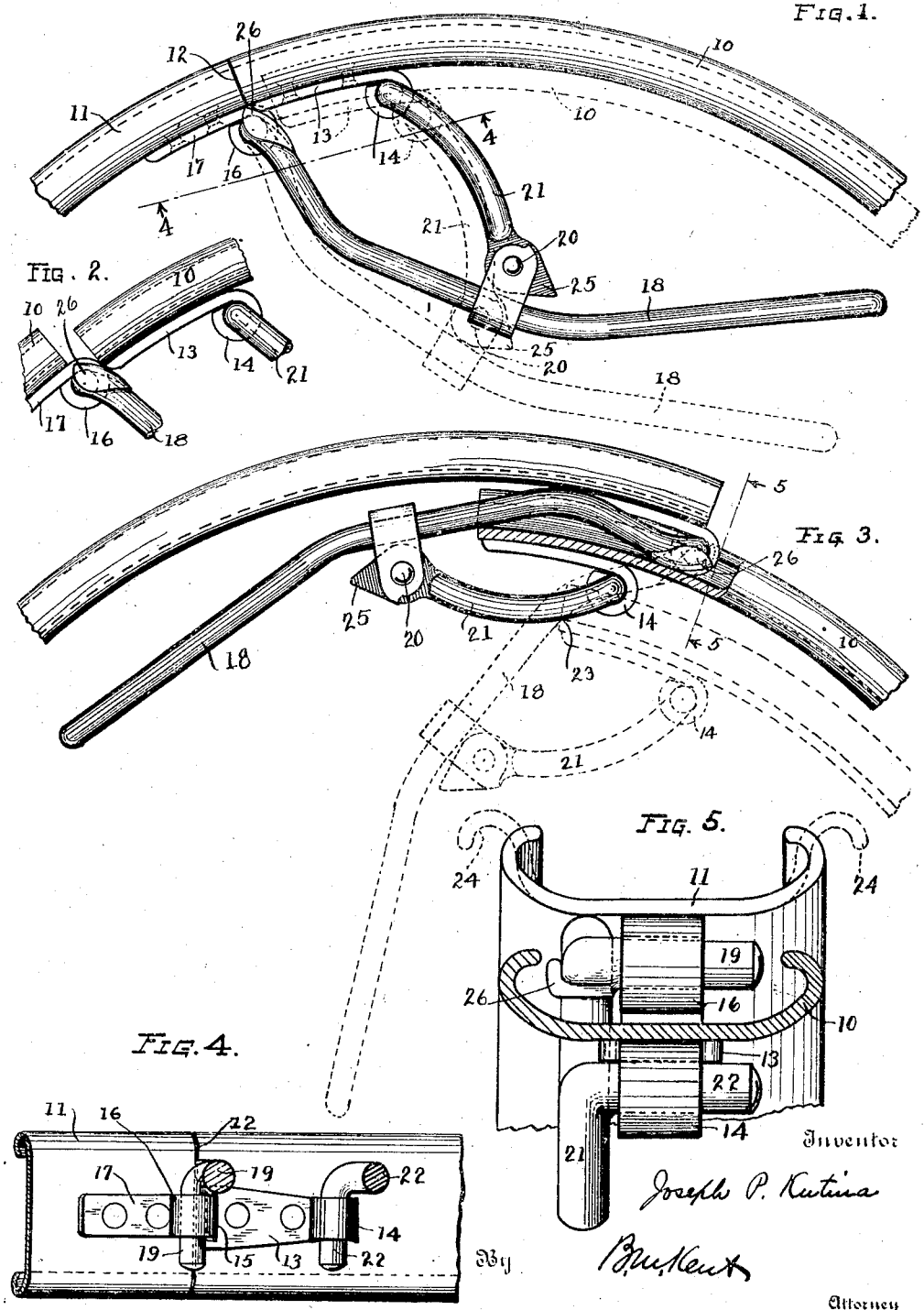

Patented Apr. 7, 1925.

1,532,416

UNITED STATES PATENT OFFICE.

JOSEPH P. KUTINA, OF CICERO, ILLINOIS.

RIM-OPERATING TOOL.

Application filed April 12, 1923. Serial No. 631,547.

*To all whom it may concern:*

Be it known that I, JOSEPH P. KUTINA, a citizen of the United States, and a resident of Cicero, county of Cook, State of Illinois, have invented certain new and useful Improvements in Rim-Operating Tools, of which the following is a specification.

This invention relates to means for opening and closing a transversely split rim for the removal and replacement of a tire.

It is one of the objects of the invention to provide an operating tool that will be convenient to use and require a relatively small amount of exertion on the part of the operator.

A further object is to provide a tool of simple construction that will be comparatively inexpensive to manufacture so that it will be commercially practicable.

Other objects and the features of novelty will be apparent from the following description taken in connection with the accompanying drawings, of which:

Fig. 1 is a side elevation of a rim having shown in combination therewith my improved form of operating tool;

Fig. 2 is a fragment of Fig. 1 with the rim ends partially separated;

Fig. 3 is a view similar to Fig. 1, but with parts shown in section, and illustrating the relation of the rim ends and the tool when the rim is in the open condition or with the ends fully overlapped for the removal or replacement of a tire;

Fig. 4 is a view of the rim and tool as seen from the plane 4—4 of Fig. 1; and

Fig. 5 is an enlarged transverse section on the line 5—5 of Fig. 3.

Referring to the drawings, 10 indicates one end of a transversely split rim or base member and 11 the opposite end, the split being indicated at 12 and being on a radial plane with respect to the center of the rim. On the rim end 10, I fasten, by rivets or by welding, or in any other suitable manner, a plate 13 having an eye 14 at one end and a recess 15 at the opposite end, this recess being adapted to receive the eye 16 of the plate 17 which is secured to the rim end 11 (see Fig. 4). When the rim ends are in abutting relation, as shown in full lines in Fig. 1, the position of the eye 16 in the recess 15 holds the rim ends against relative lateral displacement. The eye 16, as will be clearly observed from the different views, overlaps the split and normally serves to prevent the end 10 from being depressed inwardly by the pressure of the tire or from any other cause.

My improved rim-operating tool is illustrated in different views and consists of a bent lever 18 having a laterally extending arm 19 to project through the eye 16. Pivotally mounted on the lever 18, as indicated at 20, is a link 21, having the laterally extending arm 22 which projects through the eye 14. The length of the link 21 between the pivot 20 and the arm 22 is, as will be noted from Figs. 1 and 3, much shorter than the part of lever 18 between the pivot 20 and the arm 19. The arrangement of this tool, for opening the rim, is shown in full lines in Fig. 1, and the start of the opening movement is indicated in broken lines in Fig. 1, the rim end 10 being shown in broken lines slightly out of alignment with the rim end 11. The provision of the relatively short link 21 in combination with the longer arm of the lever 18 insures easy operation of the device to open a split rim and also insures that the device will lock the rim in the open position illustrated in Fig. 3 so as to avoid the possibility of the lever 18 flying back and injuring the operator.

From Figs. 1 and 2 it will be seen how the outer surface of the eye 16 is engaged by the rim end 10 in the opening movement. In Fig. 3 the fully open position is indicated in full lines and in this position the tool acts as a lock to prevent the rim ends from springing back into the closed position because of the end of the lever 18 being confined between the ends of the rim. It will be understood that when the rim ends are overlapped, as indicated in Fig. 3, the powerful spring action of the rim tends to restore the ends to their normal alignment but the tool, which I have provided, securely locks the parts in the position shown in Fig. 3, by making it necessary for the end 10 to move radially inward on its return movement, against its natural tendency to move outward. This feature of my improved tool provides a reliable lock for the ends of the rim when in the open position and insures that a tire may be safely removed or replaced. In Fig. 3 there is also shown in broken lines the relation of the parts in the mid-position and it will be noted that the lever 18, in the mid-position, as well as when the rim is fully opened, is in contact, at the point 23, with one end of the rim and is thus adapted to serve as a pry to move the end 10 radially inward, on its return movement, against the spring action of the rim which, as above stated tends to move the end 10 radially outward.

I have shown in most of the figures a clincher rim but it will be understood that the invention is equally applicable to a straight side rim such as is illustrated in dotted lines at 24 in Fig. 5. For convenience, I have provided a lug 25 on the arm 21 to engage with the lever 18 for the purpose of restricting the swinging movement of the arm 21 when the tool is detached from the eyes 14 and 16. I have also provided on the lever 18, at the point of connection of the arm 19, a lug or projection 26 which is adapted to enter into the split of the rim and serve to initially separate the ends.

Having thus described my invention, what I claim is:

In a tool for opening and closing transversely split tire rims, the combination of a lever having an arm projecting laterally therefrom at one end thereof, said lever being adapted to be positioned between the overlapped ends of the rim when the latter is open and to serve as a pry to force the inner of said overlapped ends radially inward in returning said inner end to its normal position in alignment with the other end, a link having an arm arranged parallel with the said laterally projecting arm of said lever and another part that is pivotally connected with said lever, the distance between said pivotal connection and said laterally projecting arm being greater than that between said connection and the arm of said link whereby said tool is adapted to lock said rim ends in their overlapped and open position.

In testimony whereof I affix my signature.

JOSEPH P. KUTINA.